Dec. 23, 1952  R. L. P. M. CHEVREAU ET AL  2,622,686
WIND MOTOR
Filed Feb. 27, 1948   4 Sheets-Sheet 1
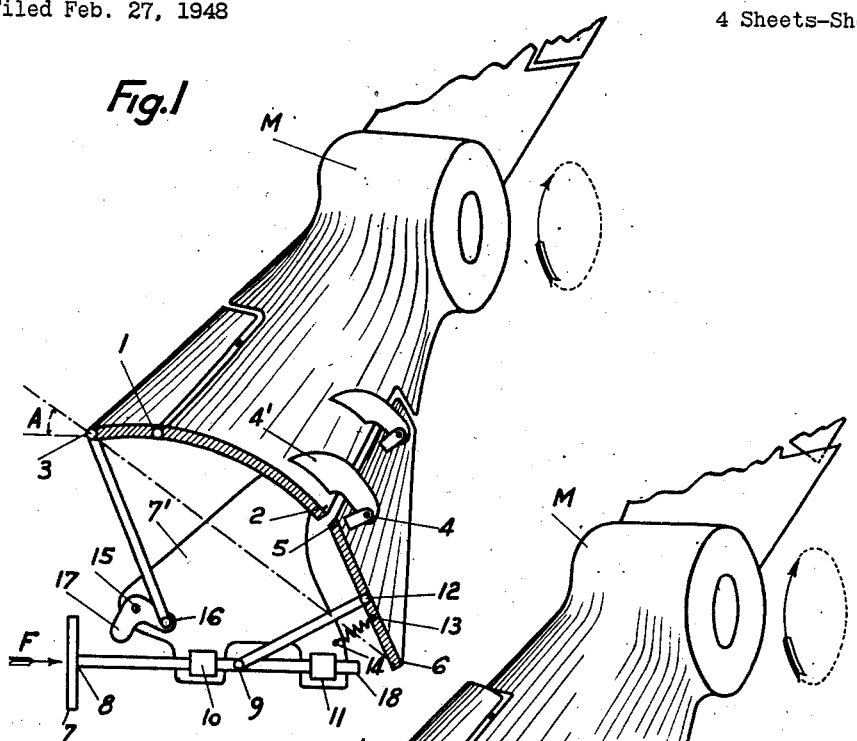
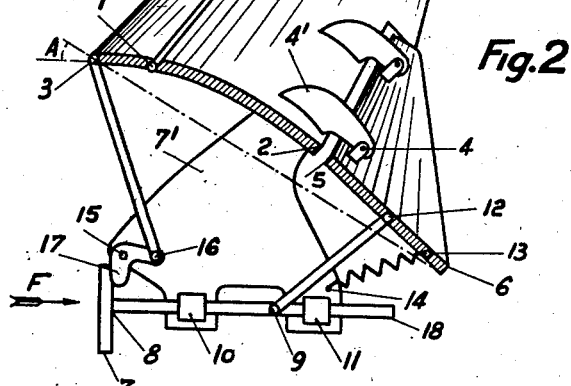
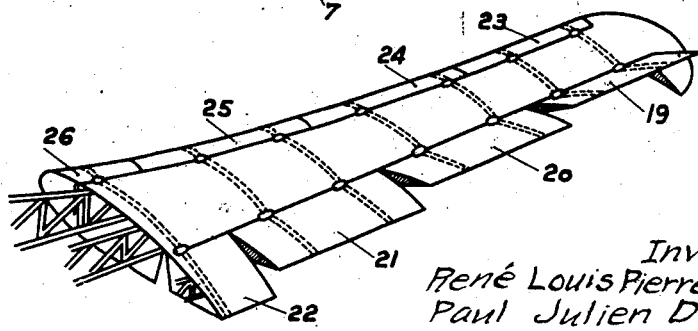
Inventors
René Louis Pierre Marie Chevreau
Paul Julien Deville
By Robert E. Burns
Attorney

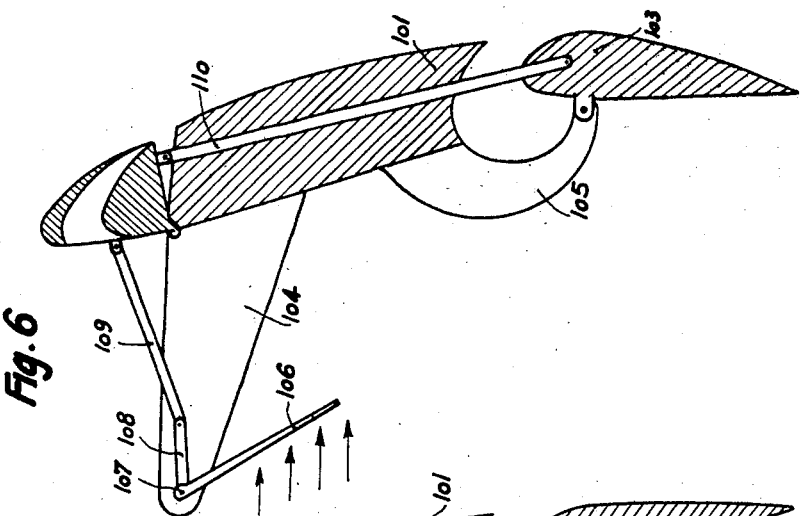
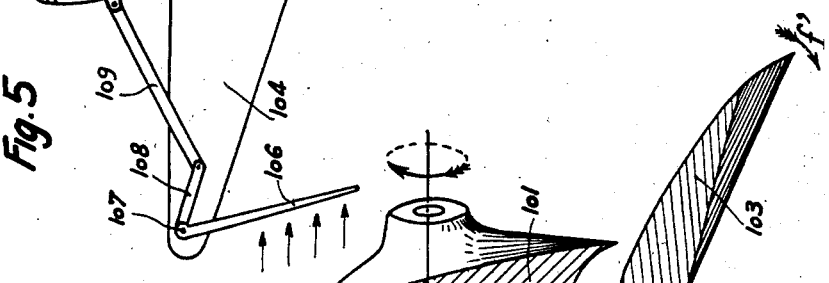
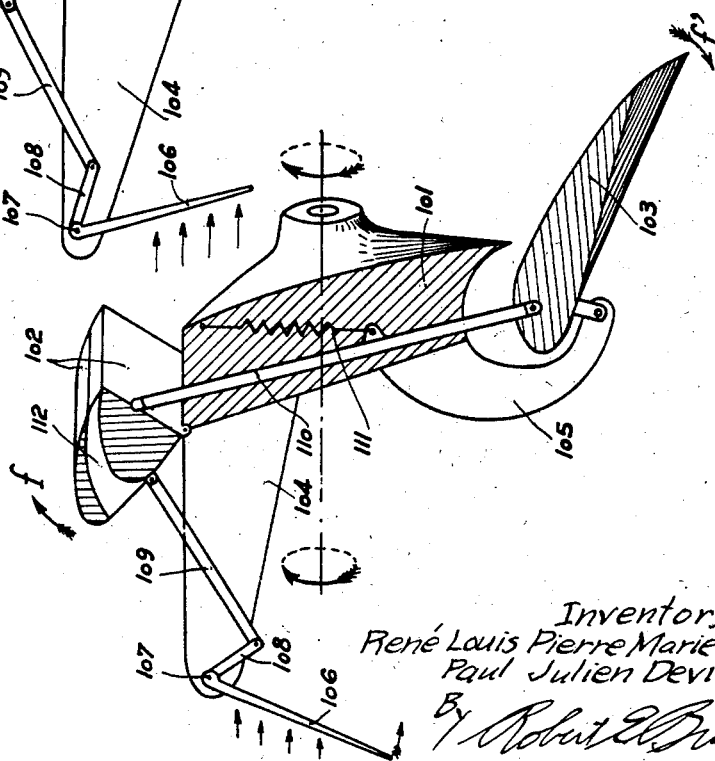

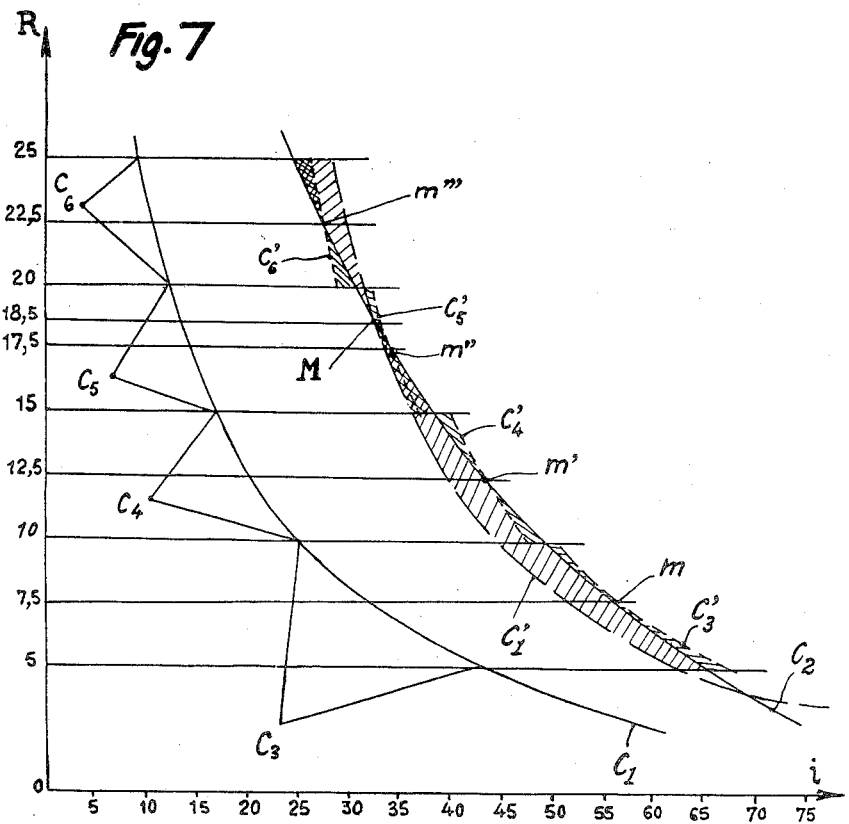

Dec. 23, 1952 R. L. P. M. CHEVREAU ET AL 2,622,686
WIND MOTOR
Filed Feb. 27, 1948 4 Sheets-Sheet 4

Inventors
Rene Louis Pierre Marie Chevreau
Paul Julien Deville
By Robert E. Burns
Attorney Patented Dec. 23, 1952

2,622,686

UNITED STATES PATENT OFFICE 2,622,686

WIND MOTOR

René Louis Pierre Marie Chevreau, Paris, and Paul Julien Deville, Vanves, France Application February 27, 1948, Serial No. 11,744
In France July 21, 1942

Section 1, Public Law 690, August 8, 1946
Patent expires July 21, 1962

5 Claims. (Cl. 170—66)

One of the difficulties in the practical use of air driven motors arises from the large variations in the wind velocity, these variations being either slow or occurring unexpectedly. The result is that the speed and output of such motors vary within wide limits.

To avoid such inconveniences wind driven air motors or air propellers with a variable pitch or rigid vanes with adjustable flaps have been proposed hitherto, the pitch of the propeller or the relative position of the adjustable flaps being controlled either by centrifugal force governors or by resilient areas exposed to wind pressure, the displacements of such devices determining the adjustment either of the pitch of the vane as a whole or the adjustment of the relative position of a flap secured adjustably to the main rigid body of the vane. The adjustment of the pitch is generally effected in the same way as in air craft propellers, i. e. by rotating the vane as a whole about an axis that is substantially perpendicular to the rotation axis of the motor. In the case of adjustments of the flaps, the relative position of such flaps is adjusted by a comparatively small rotation about an axis perpendicular to the axis of rotation of the motor, the angular displacement of every cross section of the flap along its entire length remaining substantially the same. Measures of this kind have been proposed particularly for helicopter propellers. While such means may be suitable for comparatively small diameters, they do not give satisfactory results for larger units, because bigger rotative bodies demand adjustments the angular value of which varies according to the distance of the respective section from the hub, and to the angular velocity of the motor. Therefore, in order to avoid all difficulties it becomes necessary to adapt the position of each section of the blade separately, as nearly as possible to the relative wind direction prevailing at each section.

The object of the present invention is an improvement of wind motor propeller vanes with adjustable flaps, especially for wind driven propellers with a diameter of about 50 meters giving an output of approximately 250 H. P. at a wind velocity of 8 m./sec. and rotating with 15 R. P. M., the invention obviating all above-mentioned drawbacks. The weight of a propeller of this kind would be about 12 tons.

One of the main features of the wind motor according to the invention is the fact that each vane or blade has a rigid central part of strong construction integral with the hub of the propeller or wheel, and an adjustable part subdivided into a plurality of flaps or corrective members, the position of which may be adjusted in response to the effects of wind pressure, and/or centrifugal force, e. g. the rigid central part of each vane may be provided with at least one adjustable surface at its leading edge and another at its trailing edge, both being interconnected so as to determine exactly their positions relative to each other and with respect to the central rigid part of the vane.

The flaps or corrective members are articulately secured upon the main vane body by means of axles perpendicular to the rotation axis of the propeller, or by any other known appropriate means.

A further object of the invention is to subdivide the flaps radially so as to form a number of (generally three) radial sections of flaps on the leading edge and the same number of sectional flaps on the trailing edge of the central part, the sections being arranged in linear series, along each edge of the central part, and forming the actual leading and trailing edges of the blade. Each leading flap is interconnected with one of the trailing flaps into coordinated pairs so that their relative positions with respect to the central part are determined mutually, this system permitting different relative displacements of the radially adjacent pairs.

To the above end there is provided the novel arrangement of parts hereinafter more particularly described and claimed and wherein other features and advantages of the invention will become apparent.

In the drawings:

Fig. 1 is a partial perspective view, partly cut away in section to show details of construction, of the vane or propeller of a wind driven motor constructed in accordance with the invention;

Fig. 2 is a similar view showing the construction of Fig. 1 with the articulated leading edge corrective member and trailing edge corrective member in modified position;

Fig. 3 is a perspective view of the blade of a wind motor constructed in accordance with the invention with a plurality of radially-adjacent corrective members in different relative positions;

Fig. 4 is a transverse sectional view of the blade shown in Fig. 3, showing the corrective members in displaced position;

Fig. 5 is a similar view of the blade showing the corrective members in another position;

Fig. 6 is a similar view showing the corrective members in a third position;

Fig. 7 is a graphical representation of the various values of the leading angle of the blade at various points along its length R;

Figure 8:
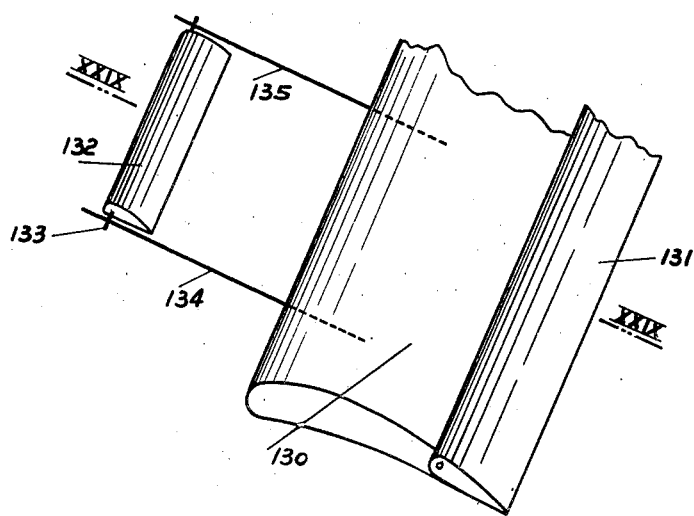
Fig. 8 is a partial perspective view of a blade constructed in accordance with the invention and provided with means for neutralizing the effect of centrifugal force on the blade.

Referring now to the drawing, particularly to Figs. 1 and 2, the device comprises a hub M whereon the central rigid body 1—2 of the vane is fixed, having in front an adjustable leading flap 1—3, and at its rear an adjustable trailing flap 5—6. Both flaps 1—3 and 5—6 are articulated to the main body 1—2. The trailing flap 5—6 oscillates about an axle 4 supported by a small plate 4'. A control device 7 perpendicular to the wind is fitted on a rod 8—9—19 guided in bearings 10—11 carried by a plate 7' secured to the central rigid body 1—2 of the vane.

At point 9, the rod is connected by means of a link 9—12 to the trailing edge 5—6. This flap is held in its locked position by a spring 13—14 the fastening point 14 of which, secured on plate 7', being thereby fixed with respect to the central rigid vane body 1—2.

At a point 15 of plate 7', there is pivotally secured to the rigid central vane body 1—2 a bell-crank lever 16—17, its one end 16 being connected by means of a link 16—3 to the front part of the adjustable leading flap 1—3, whereas its other end 17 is situated within the path of the body provided with the control device 7 when the same is pushed backwards under the pressure of the wind (represented by arrow F.)

If need be, the adjusting of the articulated flaps 1,3—5,6 in response to displacements of the control device 7, may be effected by means of an intermediate servo-mechanism. The mechanisms interconnecting the leading and the trailing flaps as shown in Figs. 4–6 are simpler than those according to Figs. 1–2. However, they are substantially equivalent and may be easily understood by reference to the drawing.

The illustrated device works as follows:

So long as the wind velocity is small, all parts are in their positions as shown in Fig. 1. The angle of incidence "A" between the direction of the wind and the chord connecting the leading front edge and the trailing rear edge of the vane flaps is at its maximum, and the maximum pressure is exerted upon the vane. When the wind velocity increases, the pressure upon the control device 7 also increases and this area yields leeward. The effect of this displacement is first to lift the trailing flap 5—6 so as to reduce the angle of incidence A and then after a while, when the control device 7 reaches the vertical end 17 of the driving lever pivoted at 15, the link 16—3 also lifts the leading flap 1—3 and both these effects combine to decrease angle A more rapidly.

As already said above, the pitch of the vane must be adapted at every one of the points of its length not only to the wind velocity, but also to the circumferential speed of the vane at each point, for it is the relative wind speed resulting from these two speeds which determines the working conditions of the vane. For an airplane propeller of small diameter, it is assumed that it is sufficient to adapt the pitch exactly to the conditions prevailing at one point of its blade which is situated at a distance from its hub equal to about three quarters of the length of said blade. However, for a wind motor wheel the diameter of which may be 50 meters and more, the differences between the values of the circumferential speeds at various points of the vane are of a magnitude such that if the pitch of an entire vane were adapted exactly to the conditions of one particular point of its length, the result would be that a part of the vane would tend to accelerate the rotation, while other parts of the vane would tend to slow the propeller. This is shown in Fig. 7 where curves $C_1$ and $C_2$ represent respectively, for wind velocities of 8 m./sec. and 20 m./sec., the values which the angle of incidence A of the vane (abscissae) should have at various distances from the hub (ordinates). In the case of a variable pitch vane without articulated flaps (curve $C_1$ which corresponds to a wind velocity of 8 m./sec.), when the same is exposed to the action of a wind of 20 m./sec., the adaptation of the angle of incidence that is produced by a simple rotation of the rigid blade about its longitudinal axis, becomes exact in one point only, this point being situated at a distance equal to three quarters of the length of the vane. Now a curve $C'_1$ may be established which is practically parallel with the curve $C_1$, and which passes through M. The rotation of the vane about its longitudinal axis results in a uniform increase (with eventual decrease) of the angle of incidence of the entire vane or in other words, it results in shifting of curve $C_1$ in the diagram parallel to itself. Accordingly, if an exact adaptation of the angle of incidence is required for a certain point, curve $C_1$ is to be shifted in the diagram parallel to itself until it intersects the curve $C_2$ at that point, i. e. the vane must be rotated by an angle the value of which is determined by the value of shifting of curve $C_1$. It is obvious that for every abscissa (i. e. distance of the point from the wheel hub center) another angle or rotation of the vane about its longitudinal axis is required. Fig. 7 proves, that there may be two points of intersection of curves $C_1$ and $C_2$ so that the variations in the necessary amount of rotation of the vane may be positive as well as negative ones (above and below the point of intersection as represented in Fig. 7 which shows the shifting of curve $C_1$ into the position $C'_1$ where it intersects curve $C_2$ at M, the ordinate for which corresponds to $R=18.5$ m. i. e. to three quarters of the vane length of 25 meters. It can be seen then that the part of the vane which is beyond M tends to accelerate the wheel and the part below M tends to slow it down.

The adjustment of the angle of incidence of the vane must vary accordingly to the variation of the distance of different points of the vane from the hub. To this end the front flap and trailing flap for each vane of the wheel according to the invention are subdivided (Fig. 3) in a number of independent sections 23—24—25—26 ... 19—20—21—22 ..., each having, for instance, a length of 5 meters and each being provided with a separate adjusting device. Under these conditions, when sections $C_3$, $C_4$, $C_5$, $C_6$ of the curve $C_1$ are considered, these sections corresponding to 5 meter lengths of individual flaps (see Fig. 3), it becomes obvious that the individual adjustment of the angle of incidence for the sections results in a parallel displacement of the corresponding curve sections individually. When the adjustment is made so as to adapt the angle of incidence exactly at the center points $m, m', m'', m'''$ of the individual flap portions, curves $C'_3$ $C'_4$, $C'_5$, $C'_6$ will result for a wind velocity of 20 m./sec., the plurality of curves varying very little from the exact curve $C_2$ that interconnects points $m, m', m'', m'''$, which correspond to the precise adaptation at each point of the vane length.

It is of interest to make possible the varying of the values of the constant speed and output of the vane. To that end it is sufficient to alter one of the elements which determine the adjustment of the deflection of the articulated flaps.

According to another feature of the invention the wind pressure upon the control device 7 may be used to control a mechanical or electrical transmission device whereby the direction of the axis of rotation of the wind motor may be changed with respect to the direction of the wind, the effective area exposed of member 7 being altered by such means.

Certain improvements will now be described, the purpose of which is to facilitate the starting of the motor at a small wind velocity and to provide for a better adaptation of the pitch of the vanes with respect to the variations of the wind speed so as to obtain the maximum output, etc.

As shown in Fig. 4, each vane according to the invention consists of a rigid center part 101 fixedly secured to the hub, the most favorable angle of incidence for a given wind velocity having been established to correspond to conditions prevailing within each subdivision of the length of the vane, for instance 8 m./sec. There is a leading flap 102 and a trailing flap 103 articulated upon supports 104, 105, respectively, which are integral with the rigid center part 101. The displaceable parts 102 and 103 of the vane are operated by a displaceable control area 106 subject to prevailing wind pressure, this area 106 may, for example, pivot about an axis 107 provided upon support 104. Area 106, yielding under the wind pressure, acts either by means of an intermediate lever 108 integral therewith in its rotation and imparts its movement by means of link 109 to the leading flap 102, the displacement of which is transmitted by means of link 110 to the trailing flap 103. An antagonistic spring 111 having one end secured upon link 110 and its other end fixed upon the rigid center vane part 101, pulls both flaps 102 and 103 into their "no wind position" as shown in Fig. 4, i. e. the leading flap 102 is turned forward (in the windward direction) whereas the trailing flap 103 is turned in its rearward direction (opposite to that of the deflection of the leading flap).

It is evident that under these conditions, when there is no wind or when the wind is weak (Fig. 4), the flaps 102 and 103 are pulled by the action of the antagonistic spring 111 into the position of their maximum deflection, one forward, the other backward, with respect to the rigid center part 101. In order to increase the effective force further, particularly in a small wind, and especially for starting the motor, the leading flap 102 may be provided with a slit 112, the shape of which is similar to that of the interval between two blades of a turbine, a strong depression on the back face of the profile being produced when air is flowing through, this being a well known means of producing a strong lifting component $C_z$.

When the wind velocity increases, the displacement of the yielding area 106 against the action of spring 111 causes the flaps 102 and 103 to pivot in the direction of arrows $f, f'$ and to align themselves as extensions of the rigid center part 101 when the wind velocity reaches the datum velocity, for instance 8m./sec. (position shown in Fig. 6).

Now, when the wind velocity exceeds the datum velocity to which the angle of incidence of the vane has been adapted, the action of the wind on the movable area 106 causes a backward deflection of the leading flap 102 and a forward deflection of the trailing flap 103 (Fig. 6).

The complete and general solution of the problem would be after having designed the various sections with small angles of incidence appropriate to starting conditions, to twist the vane while the motor is rotating, the twist being more pronounced as the respective circumferential speed increases and especially as the distance of the section under consideration from the hub increases, or if the wind speed actually weakens, as the relationship $$\frac{V}{nd}$$

decreases. It is obvious that a rigid vane or one which is rigidly stationary can be adapted only poorly in all its sections except perhaps by chance and in one section where $$\frac{V}{nd}$$

coincides with the datum relationship. It is also apparent that a rigid vane capable of a certain rotation about a longitudinal axis along its entire length from the hub to the circumference can be momentarily and correctly adapted for one single selected section only, wherein the working conditions may be optimal ones, while the adaptation for all other sections will remain only an approximate one and even roughly approximate, being insufficient near the hub and in excess at the end of the vane.

The ideal but practically not attainable solution would consist in decomposing the vane into an infinite number of sections each of them being adjusted separately. The intermediate solution, according to the invention and which is effective for propeller blades, and for wind motor vanes as well, consists in two separate expedients:

1 (The radial division of flaps). The vane is designed so as to consist of a number (generally three) parts every one of which may be deflected and/or adjusted so as to make the middle section of each part correspond exactly to the conditions prevailing at its respective distance from the hub, e. g. for a 25 meter vane there could be provided a first rigid, non adjustable part extending from 0 to 5 meters, this part running practically idle even under most favorable conditions of adaptation; a second part extending from 5 to 10 meters, the same being adjusted exactly in its middle section, i. e. the one at the distance of 7.5 meters from the rotation axis, a third part extending from 10 to 15 meters adjusted exactly in a point at a distance of 12.5 meters from the axis of rotation, etc.

In this way the lack of precision in the adaptation of the parts of each section other than their middle (central) sections will in general approach very closely the exact positions of every section at all distances from the hub of the motor.

2 (The tangential division of flaps). It has been mentioned that according to the invention, each vane consists of a main rigid center part having a leading edge and a trailing edge provided with flaps aligned in radially adjacent position so that the extreme edges of the flaps form the real leading and trailing edges of each vane. The number of flaps on the leading edge is equal to that on the trailing edge and they are interconnected into pairs so that each movement of one of the leading edge flaps is accompanied by a displacement of the conjugated trailing edge flap (connecting rod 110 in Figs. 4–6 or numbers 132, 131 in Fig. 8). As shown in the drawings, opposite rotations are applied to the leading edge flaps in relation to those of the trailing edge flaps, the value of these displacements being determined either by special devices (e. g. "7" in Figs. 1–2, or "106" in Figs. 4–6) arranged to yield under the wind pressure exerted thereupon or, as in the embodiment according to Figs. 8–10, it may be the leading edge flap (132) itself the position whereof is entirely controlled by the direction of the relative wind, the leading edge flap determining then precisely the deflection of the trailing edge flap.

Under starting conditions the direction of the relative wind velocity $$\vec{W}$$

is identical with V, the actual wind velocity. Its angle of incidence upon the chord of zero lift of the pure "profile," i. e. the profile without deflection, would then be considerable and would exceed appreciably the incidence of the maximum lift, so that the $C_z$ lift component, which at this instant is the same as the rotation impulse, would be very small, and accordingly it would be impossible or at least extremely difficult to start.

The extreme usefulness of the deformation of the profile by means of double deflection, as described, for the starting torque becomes evident. Incidentally, it should be noted that it is the foot of the vane, that is to say the region which is nearest to the hub, which supplies the most effective partial forces of rotation for starting owing to the reduction of the angle of incidence to values which are not too high, while the parts in the neighborhood of the end of the vane supply partial rotation impulses which are practically non existent owing to the too high value of the angle of incidence in that part which is still much too high despite the double deflection.

The foregoing explanation of the phenomena occurring at the starting moment helps to understand how the double deflection of the leading and trailing flaps articulated upon the rigid center part is equivalent to a supposed rotation of the whole profile.

Afterwards, once the motor is rotating, its speed of rotation begins to modify the value and direction of the relative wind velocity $$\vec{W}$$

and to reduce the angle of incidence to a value which can now decrease below the angle of incidence corresponding to maximum lift.

Under the effect of this impulse the engine accelerates its rotation steadily so as to attain certain conditions corresponding to a certain number of revolutions at which the rotation becomes constant as long as the wind itself remains constant. It can be noted that design characteristics have been established so as to obtain a maximum output for these normal conditions. This means that an angle of incidence is to be established for each section under consideration; the angle may be rather wide but it will be smaller than the angle of maximum lift.

After such normal conditions have been reached the absolute and the relative wind velocity may increase, which results in an increase of the angle of incidence. It may happen eventually that this angle exceeds the angle of incidence of maximum lift, so that the rotation impulse component begins to diminish. An increase in the speed of rotation is avoided in this way and therefore a partial self regulation by sections having such a high value of the angle of incidence will be exerted.

It is evident that even if normal conditions are prevailing, the relative velocity, which is already high (owing to an increase in the absolute wind speed), will exert upon the control area 106 a greater pressure and therefore will deflect the leading edge flap into the windward direction (whereas the trailing edge flap is positively deflected simultaneously in the leeward, i. e. the opposite direction); in this way a corresponding diminution of the angle of incidence will be effected.

Thus, it can be seen that the effect of an increase in the wind velocity will first have a moderate tendency to increase the angle of incidence and that the same will change thereafter to an opposite tendency so as to reduce the angle of incidence, this decrease of the angle of incidence being itself accompanied by an acceleration of the motor. These changes will have a secondary effect of retarding the final tendency to accelerate the wheel. These secondary effects are helped by the inertia of the mass of the wheel as a whole so that there will be ample time for the control device to act upon the deflecting mechanism of the leading and trailing flaps and to bring them into the positions corresponding to the correct angle which is required if the optimal working conditions of the wheel are to be maintained.

By way of example, a vane may be considered which is adapted to run at a wind velocity of 8 meters per second under working conditions making ¼ of a revolution in a second, with an angle of incidence of 7° for a radius 5=20 m. Should the velocity of the wind rise to 9 m./sec., the vane will tend momentarily to attain an angle of incidence of about 8°45'; now its output will increase to 1.42 times the original one under working conditions of 0.387 revolutions per sec., with an angle of incidence of about 3°45' the leading edge flap is deflected backward and the trailing edge flap forward. The original output and working conditions will be maintained by bringing the angle of incidence back to about 5°; this state corresponds to an increase of the angle of a little more than 2°.

Obviously this maintenance of the working conditions for an increased wind velocity implies that the surplus output motivated by this increase in the wind speed is lost.

The operation of the system in the case of decreasing wind velocity can be explained in similar manner. However, should the efficiency under normal conditions be optimal for a datum wind velocity, it will be naturally impossible to keep it up for a decreasing wind since then the energy supplied and therefore also the output energy will be smaller than the energy obtained in the previous case. In order to be able to maintain the working conditions it will be necessary to admit a lesser efficiency for a datum wind velocity than for the smaller wind velocity. In this case the correction for the angle of incidence will be made in the direction opposite to that of the correction made for an increased wind, that is in turning the leading edge flap in the windward direction, i. e. forward.

If need be, cams may be introduced in the system of the gear rods so as to obtain the required relations within the connecting means more easily or more accurately.

The present improvements of the invention would find with advantage application in airplane propeller blades for the purpose of modifying the pitch of the propellers either at the time of starting or during a flight. And in the same manner the structure of the invention would be particularly suitable for the blades for helicopters or gyroplanes.

The propeller blades provided with such improvements and with the following improvement can be articulated on the hub in known manner.

Figure 9:
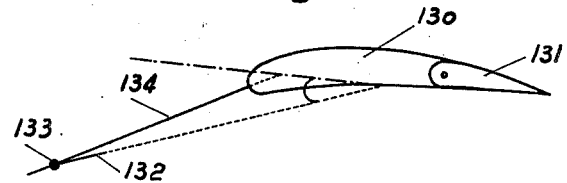
Fig. 9 is a sectional view taken approximately along the line XXIX—XXIX of Fig. 8.
Figure 10:
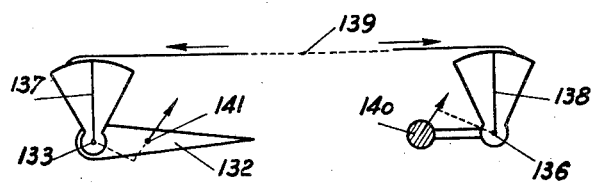
Fig. 10 is a diagrammatic view of a modified form of the construction shown in Fig. 8.

The object of a last improvement is to suppress the detrimental effects of centrifugal force on the wind testing area 132 (see Figs. 8–10). In fact the position taken by this device depends not only upon the action of the wind on it but also upon that of centrifugal force.

This last improvement consists in neutralizing the centrifugal force effects upon the wind testing area by associating therewith a movable mass equal to the mass of the body with the wind testing area and which is subjected to a centrifugal stress equal and opposite to the stress exerted upon the area itself. Thus the centrifugal and compensating stresses will be neutralized.

According to the embodiment of this improvement shown in Figs. 8 to 10, the rigid central part of vane 130, secured to the hub, is provided with an articulated trailing flap 131. The position of this trailing flap 131 is determined by a corresponding wind testing area 132 in the form of a warped flap fitted like a wind vane on an axle 133 and maintained in front of the leading edge of the central body 130 and parallel to its general direction by two members 134—135.

It can be seen in Fig. 9 (showing a transverse diagrammatical sectional view of vane 130 along plane XXIX in Fig. 8) that the testing area 132 is disposed at an angle to the direction of zero lift. Said angle is the leading angle of the relative wind; its variations or the values connected therewith, such as for instance, the variations of the angle by which the area 132 is disposed are used to produce the required deflection of the trailing flap 131 by means of any appropriate and direct transmission or through an intermediate power servo-mechanism, or with intermediate interchangeable cams to modify the deflection according to prevailing conditions.

However to make this arrangement work correctly, the position of the wind testing area 132 must be independent from any directing effect due to centrifugal force on account of the fact that axle 133 parallel with the windward edge of the central rigid vane body 130 is not exactly perpendicular to the rotation axis of the motor. To avoid said inconvenience a second axle 136 has been provided (Fig. 10) e. g. within the central rigid vane body 130 said second axle 136 being parallel with axle 133 of the wind testing area 132. Said two axles 133 and 140 carry two parallel fingers or segments 137, 138 interconnected e. g. by means of a cable 139; axle 136 carries a mass 140 the position of which with respect to the axle is arranged symmetrically to that of the center of gravity of the testing area 132 with respect to its own axle 133, their weights being equal. The moments of rotation due to the centrifugal force on the testing area 132 and upon the balancing mass are equal and opposite; the wind testing area 132 is therefore relieved of this directing stress of the centrifugal force and its direction gives exactly the relative direction of the wind.

What we claim is:

1. A wind motor comprising a propeller having a plurality of blades extending radially from the axis of said propeller, at least one series of airfoil elementary corrective members pivotally mounted on at least one edge of each of said blades, and disposed in radially adjacent position along the radial length of each of said blades, each member of each series being movable independently of the other members, an adjustment device for each of said members responsive to changes in wind velocity, each adjustment device being mounted in the same general radial portion of the blade in which the corresponding corrective member is pivotally supported, whereby each adjustment device is exposed to substantially the same wind which acts upon the corresponding corrective member, and means for connecting each of said adjustment devices to each corresponding corrective member for automatically varying the position of said corresponding corrective member upon each displacement of said device by changing wind velocity.

2. A wind motor as defined in claim 1, wherein each of said adjustment devices comprises a pivotally-mounted wind feeler.

3. A wind motor as defined in claim 1, wherein each of said adjustment devices comprises a pivotally-mounted elongated wind feeler having a wind engaging surface substantially parallel to the edge of the associated blade.

4. A wind motor as defined in claim 1, wherein each of said adjustment devices comprises a pivotally-mounted wind feeler, and means for compensating the centrifugal strain to which said feeler is submitted upon rotation of the propeller.

5. A wind motor as defined in claim 4, further comprising for each centrifugal stress compensating means on each wind feeler, a pivotally-mounted arm having a pivot axis parallel to the pivot axis of the feeler and having a compensating mass disposed at its end, and means connecting the feeler and the pivoting arm whereby the centrifugal stresses to which the feeler and compensating mass are subjected are opposed and balanced.

RENÉ LOUIS PIERRE MARIE CHEVREAU.
PAUL JULIEN DEVILLE.

REFERENCES CITED

The following references are of record in the file of this patent:

UNITED STATES PATENTS

| Number | Name | Date |
|---|---|---|
| 1,266,518 | Mulrony | May 14, 1918 |
| 1,874,053 | Lambert | Aug. 30, 1932 |
| 2,095,734 | Dornier | Oct. 12, 1937 |
| 2,135,887 | Fairey | Nov. 8, 1938 |
| 2,153,523 | Roberts | Apr. 4, 1939 |
| 2,272,664 | Grapler | Feb. 10, 1942 |
| 2,358,967 | Everts | Sept. 26, 1944 |
| 2,454,440 | Foulston | Nov. 23, 1948 |

FOREIGN PATENTS

| Number | Country | Date |
|---|---|---|
| 260,970 | Italy | Oct. 24, 1928 |
| 388,827 | Great Britain | Mar. 9, 1933 |
| 482,607 | Germany | Sept. 17, 1929 |
| 545,288 | France | July 18, 1922 |